J. F. & F. L. OHMER.
SPEEDOMETER.
APPLICATION FILED OCT. 16, 1916.

1,262,835.

Patented Apr. 16, 1918.

Inventors
Jno. F. Ohmer &
Frederick L. Ohmer

Witnesses
W. Siebler
M. Galloway

By R. J. McCarty
their Attorney

UNITED STATES PATENT OFFICE.

JOHN F. OHMER AND FREDERICK L. OHMER, OF DAYTON, OHIO.

SPEEDOMETER.

1,262,835.

Specification of Letters Patent.  Patented Apr. 16, 1918.

Application filed October 16, 1916.  Serial No. 125,785.

*To all whom it may concern:*

Be it known that we, JOHN F. OHMER and FREDERICK L. OHMER, citizens of the United States, residing at Dayton, in the county of Montgomery and State of Ohio, have invented certain new and useful Improvements in Speedometers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in speedometers for indicating the speed of a moving vehicle. The object of the invention is to provide a device of this character which accurately indicates the speed of a driven vehicle through the instrumentality of a fluid substance which is confined within a drum or cylinder upon which is contained visible indications denoting the speed as the drum is rotated. The fluid is forced against the inner surface of the drum with varying force according to the speed of the vehicle and the fluid therein contained may be any fluid which may be acted upon by a revolving part or member which is operated from a moving vehicle.

Figure 1:
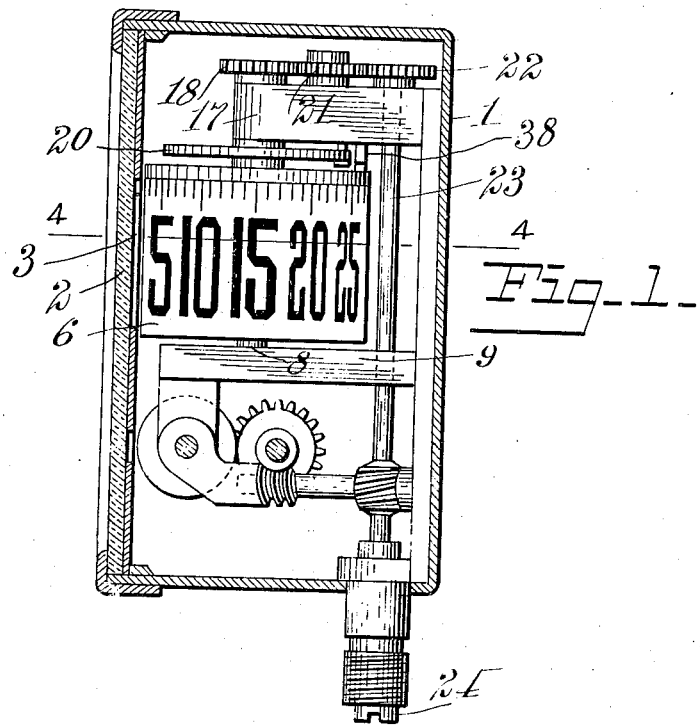
Figure 2:
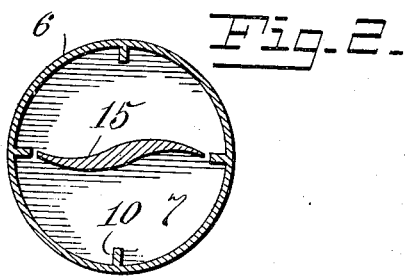
Figure 3:
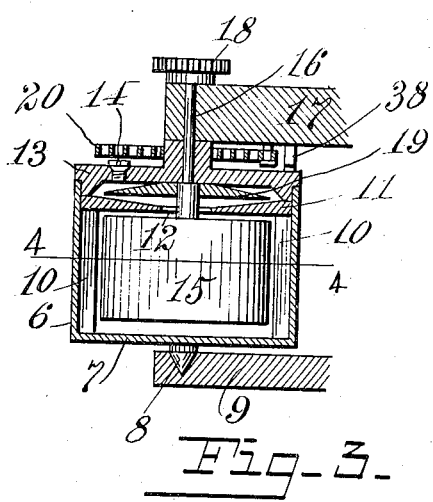

In the accompanying drawings, Figure 1 is a side elevation with the casing appearing in section and showing the speed indicator. Fig. 2 is a cross sectional view of the speed indicator on the lines 4—4 of Figs. 1 and 3. Fig. 3 is a vertical section of the indicator.

In constructing the speedometer according to our invention, we employ preferably a cylindrical inclosing case 1 which is fitted with a front glass plate 2 lying in front of sight opening 3, in the front wall of the casing and through which the speed indicator is visible. 6 designates the speed indicator which consists of a drum having a bottom 7 from which projects a needle point bearing 8 which enters a similarly shaped recess in an arm 9 of the supporting frame. The drum 6 is substantially fluid tight and is designed to contain any suitable fluid. From the inner sides thereof a series of vanes 10 project. The fluid within said drum is thrown against these vanes in a manner presently seen and by this means the drum is rotated according to the speed of the vehicle upon which the indicator is mounted. The mouth of the drum 6 has fixed therein a rigid disk 11 which has an axial opening 12 and the upper side of which tapers downwardly and inwardly to said opening. This disk 11 forms an inner top closure for the fluid within the drum, it being essential that the fluid be confined within the drum. The top of the drum 6 is sealed by a cover 13 between which and the disk 11 there is some space. Within this space a disk 19 is placed, the same having its upper surface tapered outwardly to the margin thereof. This disk 19 rotates by being attached to an enlarged part of the spindle 16. It is placed above the lower disk 11 and its purpose is to direct any of the fluid back to the interior of the drum. This is the purpose of tapering the upper surface of the disk 11 so that the fluid may gravitate through the opening 12 of said disk 11, and in tapering the upper surface of the disk 19 in the opposite direction from the tapered surface of disk 11. It will be readily seen that in the rotation of the disk 19 any oil that has been forced upwardly from the drum will be thrown out to the disk 11. The fluid will gravitate down the tapered surface of said disk 11. The cover or cap 13 has an opening through which the propulsion fluid is introduced to the drum and which opening is closed by a screw plug 14. Within the drum 6 and, consequently, in the fluid therein contained, a rotatable agitator or paddle 15 is placed. In the operation of this agitator, the fluid is forced against the vanes 10 on the inner surface of the drum 6 and said cup is thereby revolved in accordance with the speed at which the agitator revolves. The agitator 15 is fixed to a depending spindle 16 which projects freely through the opening 12 in the inner closure 11 of the drum and through an opening in the axis of the cover 13. The diameter of the spindle 16 is reduced where it passes through the cover 13 and a minimum amount of friction is met thereby. The said spindle 16 enters the laterally extending frame portion 17 which is the bearing therefor, a minimum amount of friction being also met by the spindle in the bearing. The end of the spindle 16 is provided with a toothed pinion 18 which is a motion transmission element, to be again referred to. A return spring 20 is employed to control the position of the indicator or drum 6 as the force of the fluid against the vanes 10 increases and diminishes and when the vehicle stops the spring returns the indicator 6 to normal position. A stop 38 arrests the indicator at the zero position. The spring 20 may be connected in any convenient way to control the position of the indicator. In the drawings, we have shown a convolute or clock spring one end of which is connected to the cover of the indicator and the other end to a fixed part of the frame, such as the extended portion 17. The pinion 18 on spindle 16 is in mesh with a transmission gear 21 which is geared to the upright shaft 23 through a gear 22 on said shaft 23. The shaft 23 has suitable bearings in the frame work of the machine and is provided with a suitable coupling end 24 which may be coupled to the well known flexible shaft (not shown) but which is a common means for connecting the speedometer to a revolving part of a vehicle. It will be apparent that the agitator 15 is moved in accordance with the speed of the moving vehicle and that the indicator 6 upon the outer surface of which numerals are inscribed will indicate the rate of speed; as the speed decreases, the indicator retracts in its movement under the influence of the spring 20. It will be obvious that the area of the agitator 16 may be varied as well as the diameter of the indicator 15. The character of fluid used may to some extent involve variations in these structures, also many of the numerous fluids may be found available as the medium to be acted upon by the agitator, such as alcohol, water, the lighter oils, mercury, air, etc.

Having described our invention, we claim.

In a device of the character specified, a drum adapted to contain a fluid to be agitated, said drum having a series of inwardly projecting vanes on the inner surface thereof, a rotating agitator within said drum adapted to throw the liquid against said vanes to rotate said drum proportionate to the speed at which the agitator rotates, a disk within said drum above the agitator having an inwardly tapered upper side with an opening in the axis thereof through which the spindle of the agitator extends, a cover for said drum, said cover being recessed on its inner surface to provide a space between said cover and said disk, and a second disk having its upper surface tapered downwardly to the circumference thereof and attached to the spindle of the agitator, and a spring for controlling said drum when free from the influence of the agitator, substantially as specified.

In testimony whereof we affix our signatures, in presence of two witnesses.

JOHN F. OHMER.
FREDERICK L. OHMER.

Witnesses:
 MELLIE GALLOWAY,
 MATTHEW SIEBLER.